(12) United States Patent
Augenstein et al.

(10) Patent No.: US 8,930,686 B2
(45) Date of Patent: Jan. 6, 2015

(54) DEDUPLICATION OF ENCRYPTED DATA

(75) Inventors: Oliver Augenstein, Weil i.Schoenbuch (DE); Stefan Letz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/502,463

(22) PCT Filed: Oct. 25, 2010

(86) PCT No.: PCT/EP2010/066047
§ 371 (c)(1),
(2), (4) Date: Apr. 17, 2012

(87) PCT Pub. No.: WO2011/076463
PCT Pub. Date: Jun. 30, 2011

(65) Prior Publication Data
US 2012/0204024 A1    Aug. 9, 2012

(30) Foreign Application Priority Data
Dec. 23, 2009   (EP) .................................. 09180567

(51) Int. Cl.
*H04L 29/06*    (2006.01)
*G06F 11/14*    (2006.01)
*G06F 21/60*    (2013.01)

(52) U.S. Cl.
CPC ........ *G06F 11/1453* (2013.01); *G06F 11/1451* (2013.01); *G06F 11/1464* (2013.01); *G06F 21/602* (2013.01); *G06F 2221/2107* (2013.01); *G06F 221/2115* (2013.01); *G06F 2221/2141* (2013.01)
USPC ....................................................... 713/150

(58) Field of Classification Search
CPC .......................... G06F 11/1458; G06F 11/1453
USPC .......................................................... 713/150
See application file for complete search history.

(56) References Cited

U.S. PATENT DOCUMENTS

| | | | |
|---|---|---|---|
| 8,199,911 B1 * | 6/2012 | Tsaur et al. ...................... | 380/44 |
| 8,335,877 B2 * | 12/2012 | Bondurant et al. ............. | 710/68 |
| 2007/0208800 A1 * | 9/2007 | Frohlich et al. ............... | 709/203 |
| 2008/0104146 A1 | 5/2008 | Schwaab et al. | |
| 2009/0171888 A1 | 7/2009 | Anglin | |
| 2009/0313483 A1 | 12/2009 | Ranade | |

OTHER PUBLICATIONS

Storer, Mark W. et al., "Secure Data Deduplication", StorageSS '08: Proceedings of the 4th ACM International Workshop on Storage Security and Survivability, Alexandria, Virginia, New York, NY, USA, [Online] Jan. 1, 2008, pp. 1-10.
U.S. Appl. No. 13/772,421, 1 page.

* cited by examiner

*Primary Examiner* — Pramila Parthasarathy
(74) *Attorney, Agent, or Firm* — Francis Lammes; Stephen J. Walder, Jr.; Jeffrey S. LaBaw

(57) ABSTRACT

A mechanism is provided which allows to de-duplicate encrypted data such that the de-duplication ratio for encrypted data is similar to the de-duplication ration of the corresponding un-encrypted data and the purpose of encryption is not obfuscated, i.e. only the originator of the data (the client) can decrypt—and hence read—the data. This is achieved by interwoven the de-duplication algorithm with the encryption algorithm in a way that the data are encrypted with a key that is generated from the unencrypted data. Afterwards, that key is itself encrypted with an encryption key being private to a particular client. Due to the fact that the private key is not effecting the encrypted data stream, it can still be de-duplicated efficiently.

8 Claims, 4 Drawing Sheets

DEDUPLICATION OF ENCRYPTED DATA

BACKGROUND

This invention relates to backing-up data within a computer environment and particularly to a computer implemented method, a client computer system and a server interconnected through a communication link for backing-up data. It is also related to a computer program product comprising codes to be executed on the client and codes to be executed on the server for backing-up data.

Data de-duplication is an important technology in virtual tape libraries (VTLs) and for backup and archiving solutions in order to decrease the total amount of disk space required to store a certain amount of data. As an example, consider 1000 personal computers all backing up their windows operating system OS. Instead of keeping 1000 copies of the data corresponding to the OS, a de-duplication algorithm would ensure that the backup server retains only one physical copy, although 1000 clients would effectively believe that the retained copy is private to them.

The methods applied for de-duplication vary but it is getting a best practice that an object is segmented into multiple (fixed or variable size) segments (also called junks), each of which is then being associated with a hash value. Objects leading to identical hash values are good candidates for duplicates that can be eliminated to decrease the amount of data that needs to be stored on a backup server.

US2009/0171888 discloses techniques for data de-duplication. A chunk of data and a mapping of boundaries between file data and meta-data in the chunk of data are received. The mapping is used to split the chunk of data into a file data stream and a meta-data stream and to store file data from the file data stream in a first file and to store meta-data from the meta-data stream in a second file, wherein the first file and the second file are separate files. The file data in the first file is de-duplicated.

Some products already available on the market like Tivoli System Manager TSM combine segmentation or splitting of data and hashing. In particularly, TSM is using some finger printing algorithm to segment an object into multiple variable length junks and then creates a 128 bit SHA-1 (secure hash function) value as hash key. TSM does provide special handling for false matches (i.e. two different junks leading to the same SHA-1 key) except that it is upon restore validating a MD5 checksum (a cryptographic hash function) of the entire object that has been calculated at backup time.

US2008/0104146 describes a secure networked data shadowing system connected to a plurality of monitored computer systems via an existing communication medium to store the shadowed data. The data is encrypted by the monitored computer system using a cryptokey, and the data file is processed using a hash function prior to encryption, so the contents of this file are uniquely identified. Thus, the encrypted file is stored in its encrypted form and the hash index is used to identify the encrypted file. A "data de-duplication" process avoids storing multiple copies of the same files by identifying instances of duplication via the hash index. Files that have the same hash index can be reduced to a single copy without any loss of data as long as the file structure information for each instance of the file is maintained.

Due to its nature, data de-duplication is not really suitable for de-duplicating encrypted data. This is because the same file would typically generate non-identical data streams when being encrypted with different encryption keys. And there exists up to now no technology allowing to efficiently de-duplicating encrypted data without some counter effect weakening the security effect achieved by using encryption. For example, if 1000 clients encrypt the Window OS during the backup on the client side in order to ensure that no one else can read the data, then a server side de-duplication algorithm will not be able to detect that the same file has been sent 1000 times. Thus, a de-duplication procedure will not work effectively in such case.

SUMMARY

In view of the above, it is an object of the present invention to provide a backing-up method with a de-duplication procedure compatible with the requirement to forward data between client and server in a trusted way and to store the data on the server in a fully encrypted form.

The shortcomings of the prior art are overcome and additional advantages are provided through the provision of a computer implemented method allowing to de-duplicate encrypted data such that the de-duplication ratio for encrypted data is identical to the de-duplication ration of the corresponding un-encrypted data and the purpose of encryption is not obfuscated, i.e. only the originator of the data (the client) can decrypt—and hence read—the data. In order to accomplish that goal, it is proposed to interwoven the de-duplication algorithm with the encryption algorithm in a way that the data are encrypted with a key that is generated from the unencrypted data. Afterwards, that key is itself encrypted with an encryption key being private to a particular client. Due to the fact that the private key is not effecting the encrypted data stream, it can still be de-duplicated efficiently. This is also true when spanning multiple clients, each using there own private key being by definition never the same encryption key.

A computer implemented method according to the invention for backing-up data within a computer environment with a client and a server interconnected through a communication link comprises the step of storing at least one or several client files within a repository on client side. A client hash value is then generated from the client file usually at the client side. This client hash value is used for encrypting the client file while the client hash value itself is encrypted using a private key from the client. The encrypted client file and the associated encrypted client hash value are forwarded to the server. Thanks to the applied encryption, the forwarding is therefore performed fulfilling usual trust requirements. Client metadata are stored at the server in a metadata repository associated to the client, the client metadata comprising a mapping of the client file within the client repository and the encrypted client hash value. A hash value is generated at least partly from said client file for checking for duplicates of client file on server side stored in an encrypted form by comparing this hash value with all the hash values usually stored at the server. In case no such hash value could be found then a mapping of the used hash value to the encrypted client file is stored into a hash map and said used hash value is referenced in the client metadata associated to the client file. In such a way, the performed checking allows to avoid any duplicates i.e. to store only a single instance of identical encrypted files at the server.

In an embodiment according to the invention, the used hash value for checking duplicates (de-duplication hash value) is generated by the client using a deterministic combination of the client hash value from said client file, the client file and the encrypted client file, said used hash value being forwarded to the server. In an alternative, only the client file prior to be encrypted possibly but not necessarily combined with the client hash value are used for generating the de-duplication hash value. In a further alternative, this hash value is generated by the server using possibly only the encrypted client file.

In an advantageous embodiment, the client file is split in a deterministic way into chunks of data while the steps to be applied on the client file are applied instead on each of said chunks of data. Therefore, a client hash value is generated for each of the chunks from said client file, the different client hash values to be used for encrypting the respective chunks. Also, a specific hash value (de-duplication hash value) for each encrypted chunks is generated for checking for duplicates of respective encrypted chunks, those specific hash values being generated at least partly from the respective chunks.

When the computer environment comprises several clients interconnected with the server via at least a communication link, then the different clients must apply identical procedure for the generation of hash value and for encryption while using each a specific private key. This is a condition sine qua non to apply effectively a de-duplication procedure according to the present invention spanning multiple clients to avoid any duplicates of files or chunks stored at or managed by the server. Only then, an identical file or chunk coming from two different clients will be recognized by the server as duplicate and therefore stored only once while being accessible for both clients using the hash map and the reference in the respective client metadata.

In an embodiment according to the invention, following steps can be applied when restoring a file. A requestor requests a client file of the server. A looking-up procedure to the requested client file is started at the server by looking-up in the client metadata preferably after references from the requested client file. The found hash value referenced in the client metadata associated to the requested client file is used to map to the requested encrypted client file. The server sends to the requestor client the encrypted client hash value corresponding to the requested client file stored at the server metadata repository associated to the client. The requestor client decrypts the received encrypted client hash value using requestor client private key. The server sends also to the requestor client the encrypted requested client file to be decrypted by the requestor using the decrypted client hash value. Even if this copy of the requested encrypted client file is not the original copy coming from this requestor but a duplicate one from another client, the requestor will nevertheless be able to decrypt the received encrypted client file using its own client hash value also forwarded by the server. Such hash value while being identically generated by two different clients for the same client file, will be client specific after being encrypted using client private key. Therefore, it is a requirement of the method according to present invention to store each encrypted client hash value to permit the requestor to be able to decrypt the requested encrypted client file using its own client hash value.

In an alternative according to the invention the server sends to the requestor client the encrypted client hash values corresponding to the chunks of the requested client file stored at the server metadata repository. The encrypted hash values are decrypted by the requestor client using requestor client private key, the decrypted client hash values being used for decrypting the encrypted chunks of the client file sent from the server after looked-up requested client file and found hash values referenced in the client metadata associated to the requested client file to map to the respective encrypted chunks. The decrypted chunks are then concatenated at the requestor client to build the requested file.

According to another aspect of the embodiment of the present invention, a computer readable medium comprises codes to be executed on a client for backing-up data within a computer environment comprising the client and a server interconnected through a communication link, while the codes from the computer readable medium when executed on the client perform following steps: Storing a client file within a repository on client side; Generating a client hash value from said client file; Encrypting the client file using the client hash value; Encrypting the client hash value using a client private key; Forwarding the encrypted client file and the associated encrypted client hash value to the server whereas the encrypted client hash value to be stored with client metadata at the server in a metadata repository associated to the client, the client metadata mapping the client file within the client repository while a hash value generated at least partly from said client file is used at the server for checking for duplicates of client file in order to store only a single instance of identical encrypted client file at the server whereas a mapping of the used hash value to said encrypted client file is stored into a hash map and said used hash value is referenced in the client metadata associated to the client file.

The computer readable medium according to present invention possibly comprises also codes when executed on the client split in a deterministic way the client file into chunks of data while the steps to be applied on the client file are applied instead on each of said chunks by generating a client hash value for each of the chunks from said client file to be used for encrypting the respective chunks. A specific hash value is used for each encrypted chunks when checking for duplicates of encrypted chunks, those specific hash values being generated at least partly from said chunks.

The computer readable medium according to present invention possibly comprise further codes when executed on the client allow to request a client file of the server to be looked-up in client metadata while using the found hash value referenced in the client metadata associated to the requested client file to map to the encrypted requested client file to be sent to the requestor client together with the corresponding encrypted hash value corresponding to the client file stored at the server metadata repository associated to the client. The requestor client advantageously decrypts the received encrypted hash value using requestor client private key and decrypts the received encrypted requested client file using the decrypted hash value.

Other codes when executed on the client allow after receiving the encrypted client hash values corresponding to the chunks of the requested client file stored at the server metadata repository to decrypt the encrypted client hash values using requestor client private key, the decrypted client hash values being used for decrypting the encrypted chunks of the client file received from the server. The codes then allow to concatenate the decrypted chunks to build the requested file.

According to a further aspect of the embodiment of the present invention, a computer readable medium comprises codes to be executed on the server for backing-up data within the computer environment, while the codes when executed on the server perform following steps: Storing client metadata at the server in a metadata repository associated to the client, the client metadata mapping the client file within the client repository and comprising the encrypted client hash value. The codes allow also to check for duplicates of encrypted client file using a hash value generated at least partly from said client file in order to store only a single instance of identical encrypted files at the server. And a mapping of the used hash value to said encrypted client file is stored into a hash map and said used hash value is referenced in the client metadata associated to the client file. Further codes permit to look-up a requested client file in the client metadata at the server by using the found hash value referenced in the client metadata associated to the requested client file to map to the encrypted requested client file, both the encrypted client hash value and the requested encrypted client file to be sent to the requestor client. In some alternative according to the present invention, the computer readable medium comprises codes when executed on the server allow to apply all the preceding steps on chunks of data of the requested client file split in a deterministic way.

The client computer system and the server interconnected through a communication link corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
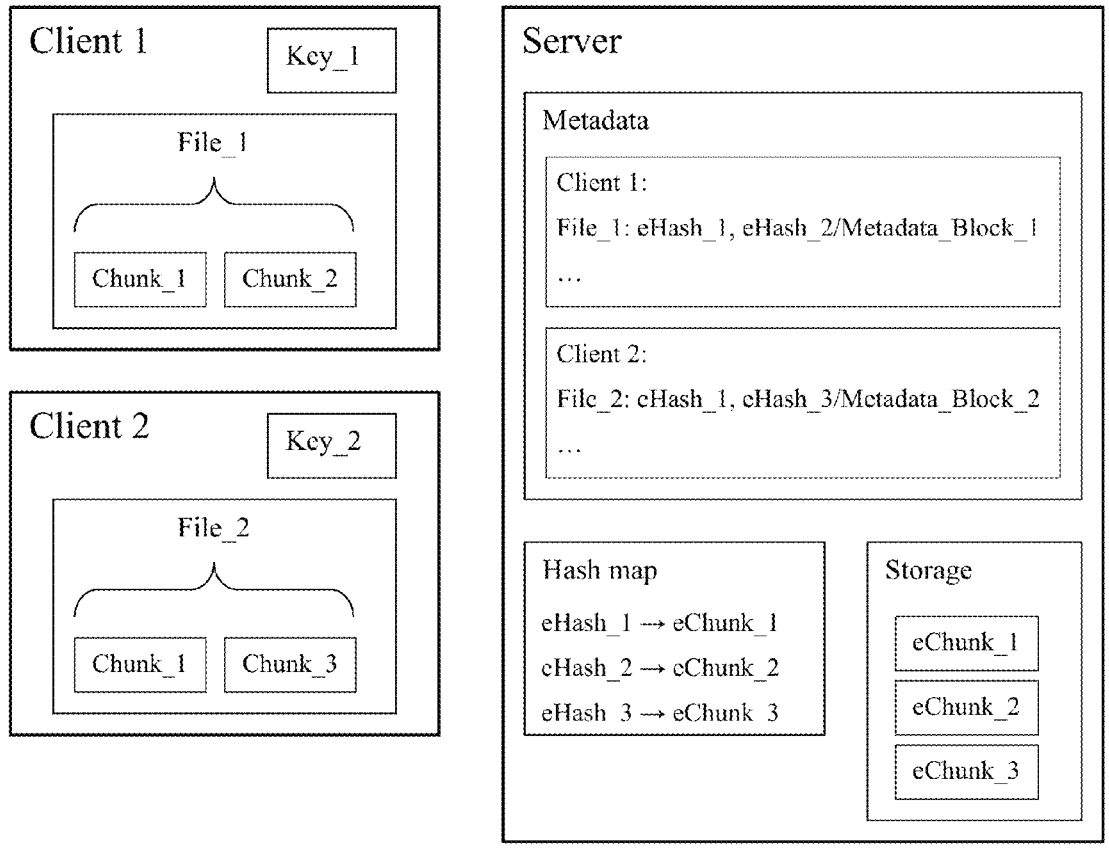
FIG. 1 illustrates one example of a schematic scenario according to the present invention.

Turning now to the drawings in greater detail, it will be seen that in FIG. 1 there is shown an exemplary scenario with two client systems (Client 1, Client 2), e.g., two different personal computers, and one server system (Server) that provides backup or storage functionality for said clients, e.g., a backup server or a VTL (Virtual Tape Library). The clients and the server are interconnected by some kind of network, e.g., a LAN or the Internet. The first client contains a file File_1 which can be divided into two parts, Chunk_1 and Chunk_2. The second client likewise contains a file File_2 which can be divided into Chunk_1 and Chunk_3. Hence, the first part of File_1 and the first part of File_2 are bitwise identical. Both clients have their own private encryption keys, Key_1 and Key_2, respectively.

The server system Server maintains a metadata repository for each client representing their files that are stored on the server including possibly folder hierarchy. In the usual case that files are split into segments or chunks of data at the client side then a file entry in this metadata repository consists of references to the chunks that make up the file, e.g., the chunks' hash values, and of an optional metadata block provided by the client and containing arbitrary information. The server usually also contains a hash map that maps hash values to chunks. The actual chunks are stored on some kind of storage inside or attached to the server, e.g., one or more HDDs (Hard Disk Drives) or a SAN (Storage Area Network).

FIG. 1 shows also the server storing encrypted chunks, eChunk_1, eChunk_2, and eChunk_3. However, it is important to note that the server is also capable of processing and storing unencrypted chunks.

Figure 2A:
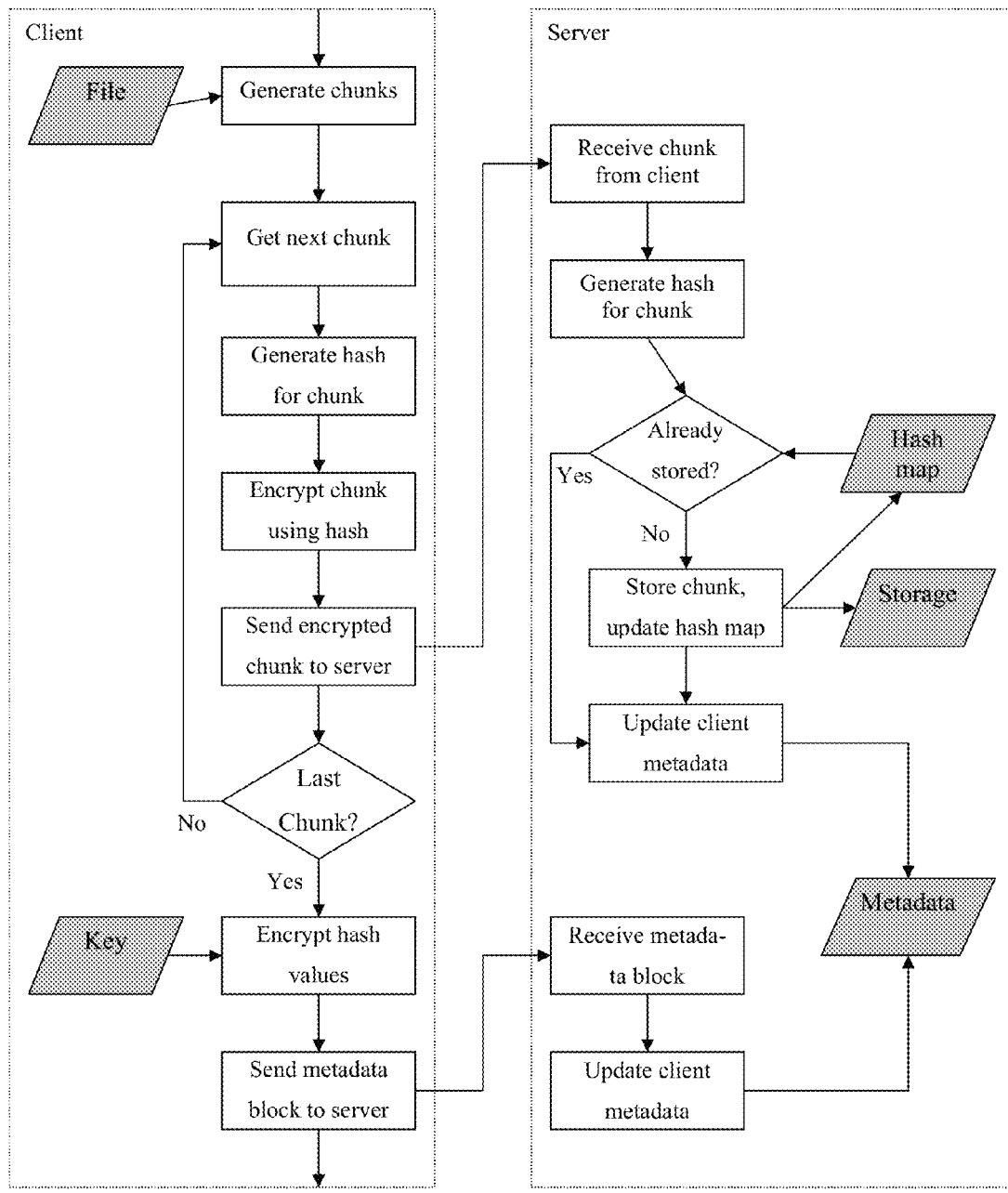
FIGS. 2a and 2b illustrate examples of a flow diagram according to the present invention.

The flowchart in FIG. 2a illustrates the backup steps according to the present invention. The following steps are executed when one of the clients backs up a file to the backup server:

1. The client executes a chunking (or fingerprinting) algorithm to cut the file into variable-length or fixed-length logical chunks. Existing algorithms can be used. Ideally, the chunks are chosen such that the probability of finding matching chunks in other files is maximized. It is important to note that usually a chunking algorithm is deterministic, which means that given the same input, such as input file and configuration settings, it will always produce the same output. Thus, the probability for finding matching chunks in similar files on different clients is high.

2. For each of the chunks produced in step 1, the client generates a hash value using an existing hash function such as SHA-1, a Secure Hash Algorithm.

3. Using an existing cryptographic algorithm, e.g., AES (Advanced Encryption Standard) or IDEA (International Data Encryption Algorithm), the client encrypts each chunk with its corresponding hash value that was generated in step 2, thereby producing encrypted chunks. The client then sends these encrypted chunks to the server. If desired, communication between client and server can be protected by a cryptographic protocol such as TLS (Transport Layer Security).

4. The client encrypts the hash values that were generated in step 2 with its private encryption key and sends the result to the server to be stored as a metadata block at the server.

5. The server executes a de-duplication algorithm as it does in state-of-the-art scenarios but based on a hash value obtained according to present invention. That hash value is generated for each chunk received from the client, e.g., using the SHA-1 hash function. Then it is checked whether it already stores a chunk with the same hash value, e.g., using a hash map. If so, it might perform an additional check to make sure that no hash collision occurred and the two chunks are really bitwise identical. If the server does not already store the chunk, it stores the chunk in some storage, references it in the metadata for the given client and the given file, and updates the hash map. Otherwise, it only references the chunk already stored. Together with the references to the chunks that make up the given file, the server stores the metadata block, which the client sent in step 4, in the metadata repository. It is important to note that the server does not have to distinguish between encrypted chunks and unencrypted chunks, and instead can treat them the same.

The same steps can be written in a more formal way for Client i:

1. File={Chunk_1, Chunk_2, ... }
2. Hash_k=hash(Chunk_k)
3. eChunk_k=encrypt(key=Hash_k, data=Chunk_k)
4. Metadata_Block_i=encrypt(key=Key, data={Hash_1, Hash_2, ... })
5. eHash_k=hash(eChunk_k)

Thereby, File is a file located in some file system on the client i. It can be separated into a number of chunks, Chunk_k. Hash_k is the hash value of such a chunk, generated by some hash function hash( ). eChunk_k is generated out of Chunk_k using some cryptographic algorithm encrypt( ) with Hash_k as the encryption key. Metadata_Block_i is generated out of the Hash_k hash values using some cryptographic algorithm encrypt( ), which can be different from the cryptographic algorithm used in step 3, and the client's private encryption key Key_1. eHash_k is the hash value of encrypted chunk eChunk_k, generated by some hash function hash( ), which can be different from the hash function used in step 2.

The steps listed above can be executed in a different order or in parallel as long as their data dependencies are satisfied. Especially, the sending and receiving of data can be executed in parallel to other parts of the processing.

The steps described above require two hash generations per chunk. In order to reduce computational complexity, the second hash generation could be replaced with a less complex function. For example, the client could produce the hash for the encrypted chunk using a function of the hash value for the unencrypted chunk, the chunk itself, and the encrypted chunk, and send this hash value to the server to use for de-duplication:

5.  eHash_k=encrypt(key=f(Hash_k, Chunk_k, eChunk_k), data=Hash_k)

Figure 2B:
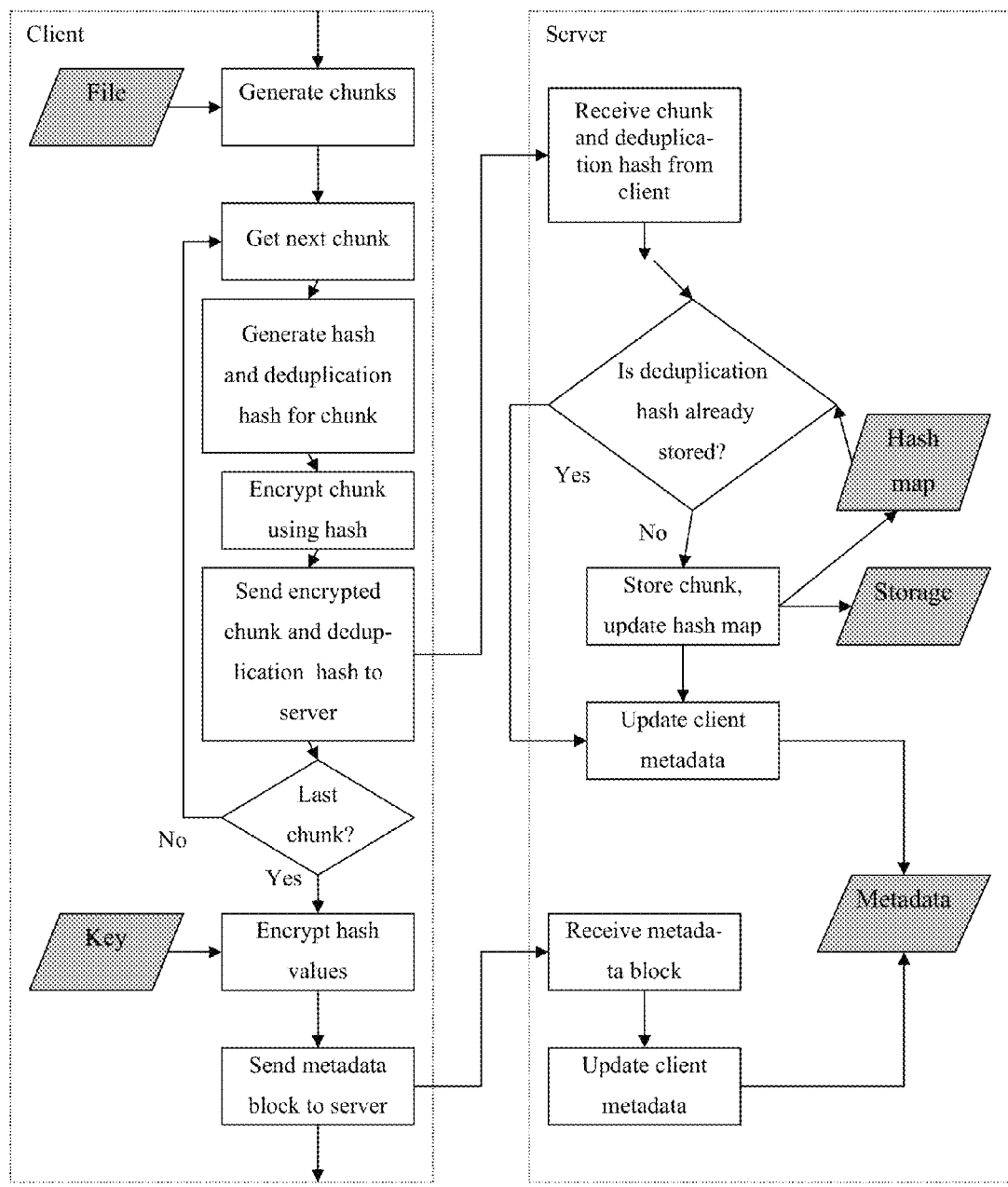

Therefore, step 5 is modified such that it is not the server which calculate the hash value to be used for applying de-duplication procedure but instead the client. In that case, the client calculates not only the hash value of each chunk used for encrypting the chunks but also the de-duplication hash value. The client sends then this de-duplication hash value together with the encrypted chunk to the server. Such alternative is described on FIG. 2b. It is also possible that the hash value used for de-duplication calculated by the client is generated using only the chunk prior being encrypted.

Figure 3:
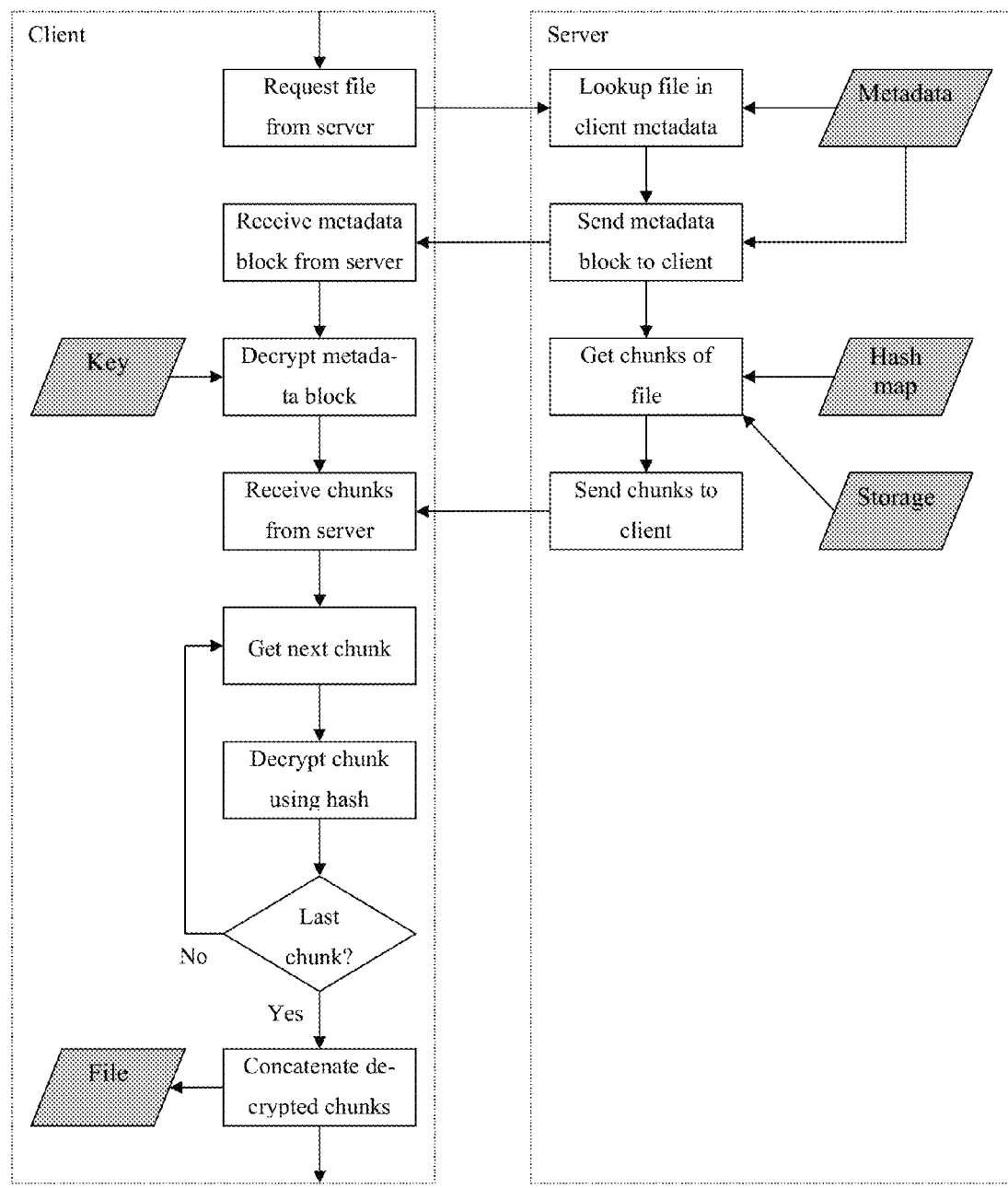
FIG. 3 illustrates one example of a flow diagram according to the present invention.

The flowchart in FIG. 3 illustrates the restore steps. The following steps are executed when a file is restored from the server to one of the clients:

1. The server looks up the file in the metadata that it maintains for the given client and the given file. Then, accessing metadata repository, hash map, and storage, the server sends the corresponding chunks and the metadata block to the client.
2. The client decrypts the metadata block using his private encryption key, thereby producing the hash values of the unencrypted chunks.
3. Using the hash values produced in step 2, the client decrypts each encrypted chunk using the corresponding hash value, thereby producing the unencrypted chunks.
4. By concatenating the unencrypted chunks produced in step 4, the client reconstructs the file.

As the backup steps, the restore steps can be executed in a different order or in parallel as long as the data dependencies are satisfied.

The same steps written in a more formal way:

1. File→{ {eHash_1→eChunk_1, eHash_2→eChunk_2, . . . }, Metadata_Block}
2. {Hash_1, Hash_2, . . . }=decrypt(key=Key, data=Metadata_Block}
3. Chunk_k=decrypt(key=Hash_k, data=eChunk_k)
4. File={Chunk_1, Chunk_2, . . . }

Thereby, in step 2, decrypt( ) is some cryptographic algorithm that decrypts Metadata_Block using the client's private encryption key Key. In step 3, decrypt( ) is some cryptographic algorithm that decrypts encrypted chunk eChunk_k using hash value Hash_k as the encryption key. It can be different from the cryptographic algorithm used in step 2.

The flowchart in FIG. 3 illustrates the restore steps showing the client requesting a file from the server, but other protocols are practicable as well. Furthermore, it shows the server sending the metadata block prior to the chunks. However, as discussed before, the order of the steps can vary depending on the actual implementation.

FIG. 3 shows that the restore process is initiated by the client by sending a request for a specific file to the server. The request contains the file identifier that allows the server to locate the file in its metadata repository, e.g., the file's complete path in the client's filesystem(s). Optionally, in case the server can contain multiple versions of a file, the file identifier can also contain a time stamp or a version number. Based on the file identifier, the information in the metadata repository, and the hash map, the server can then locate the required chunks in the storage.

The restore process instead being launched by the client could also be initiated by the server, e.g., by the administrator who is logged into the server or by some process that runs on the server. Also, there might be scenarios where a third system, e.g., another client, can initiate the restore process.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A computer program product comprising a non-transitory computer readable storage medium having a computer readable program stored therein for backing-up data within a computer environment, wherein the computer readable program, when executed on a computing device, causes the computing device to:

store a client file within a client repository on a client device;

split, in a deterministic way the client file into chunks of data;

generate a client hash value for each respective chunk of data from the client file thereby forming different client has values;

encrypt each respective chunk of data using the respective different client hash value thereby forming encrypted chunks of data;

encrypt the different client hash values using a client private key thereby forming encrypted different client hash values;

generate a specific hash value at least partly generated from the chunks of data; and forward the encrypted chunks of data and the associated encrypted different client hash values to a server, wherein the encrypted different client hash values are stored with a client metadata at the server in a metadata repository associated to the client, the client metadata mapping the encrypted chunks of data associated with the client file within the client repository, wherein the specific hash value at least partly generated from the chunks of data is used at the server for checking for duplicates of encrypted chunks of data, thereby forming a used hash value, in order to store only a single instance of identical encrypted chunk of data at the server, wherein a mapping of the used hash value to the encrypted chunk of data is stored into a hash map and the used hash value is referenced in the client metadata associated to the chunk of data.

2. The computer program product according to claim 1, wherein the computer readable program further causes the computing device to:

allow a request of the client file from the server, thereby forming a requested client file, to be looked-up in the client metadata while using the encrypted different client hash values referenced in the client metadata associated to the chunks of data associated with the requested client file to map to the chunks of data to be sent to the requestor client device together with the encrypted different client hash values corresponding to the chunks of data associated with the requested client file stored in the metadata repository associated to the client file at the server, the requestor client device decrypting the encrypted different client hash values using the client private key of the requestor thereby forming a decrypted different client hash values and decrypting the encrypted chunks of data using the decrypted different client hash values.

3. The computer program product according to claim 1, wherein the used hash value for checking duplicates is generated by the client device using a deterministic combination of the respective hash values of the chunks of data from the client file, the chunks of data and the encrypted chunks of data, and the used hash value being forwarded to the server.

4. The computer program product according to claim 1, wherein the computer environment comprises several clients interconnected with the server via at least a communication link, the clients applying identical procedure for generation of hash value and for encryption.

5. A system for backing-up data within a computer environment comprising:

a processor; and a memory coupled to the processor, wherein the memory comprises instructions which, when executed by the processor, cause the processor to:

store a client file within a client repository on a client device;

split, in a deterministic way the client file into chunks of data;

generate a client hash value for each respective chunk of data from the client file thereby forming different client hash values;

encrypt each respective chunk of data using the respective different client hash value thereby forming encrypted chunks of data;

encrypt the different client hash values using a client private key thereby forming encrypted different client hash values;

generate a specific hash value at least partly generated from the chunks of data; and forward the encrypted chunks of data and the associated encrypted different client hash values to a server, wherein the encrypted different client hash values are stored with a client metadata at the server in a metadata repository associated to the client, the client metadata mapping the encrypted chunks of data associated with the client file within the client repository, wherein the specific hash value at least partly generated from the chunks of data is used at the server for checking for duplicates of encrypted chunks of data, thereby forming a used hash value, in order to store only a single instance of identical encrypted chunk of data at the server, wherein a mapping of the used hash value to the encrypted chunk of data is stored into mash map and the used hash value is referenced in the client metadata associated to the chunk of data.

6. The system according to claim 5, wherein the used hash value for checking duplicates is generated by the client device using a deterministic combination of the respective hash values of the chunks of data from the client file, the chunks of data and the encrypted chunks of data, and the used hash value being forwarded to the server.

7. The system according to claim 5, wherein the computer environment comprises several clients interconnected with the server via at least a communication link, the clients applying identical procedure for generation of hash value and for encryption.

8. The system according to claim 5, wherein the instructions further cause the processor to:

allow a request of the client file from the server, thereby forming a requested client file, to be looked-up in the client metadata while using the encrypted different client hash values referenced in the client metadata associated to the chunks of data associated with the requested client file to map to the chunks of data to be sent requester client device together with the encrypted different client hash values corresponding to the chunks of data associated with the requested client file stored in the metadata repository associated to the client file at the server, the requester client device decrypting the encrypted different client hash values using the client private key of the requestor thereby forming a decrypted different client hash values and decrypting the encrypted chunks of data using the decrypted different client hash values.

* * * * *